Figure 1:
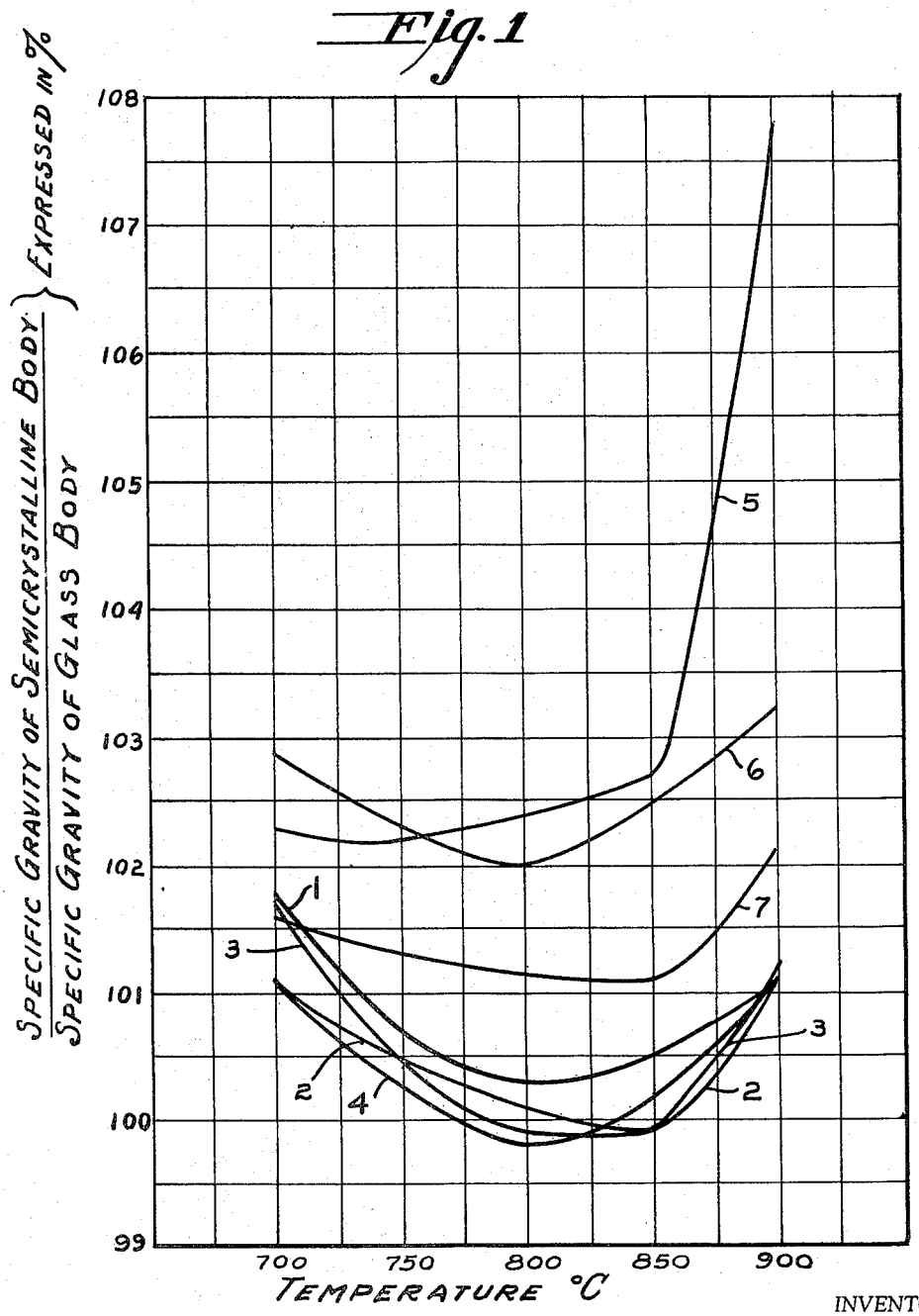

INVENTOR.
RICHARD A. EPPLER
BY
Clarence R. Patty, Jr.
ATTORNEY

INVENTOR.
RICHARD A. EPPLER
ATTORNEY

United States Patent Office 3,161,528
Patented Dec. 15, 1964

3,161,528
SEMICRYSTALLINE CERAMIC BODY AND
METHOD OF MAKING IT
Richard A. Eppler, Corning, N.Y., assignor to Corning
Glass Works, Corning, N.Y., a corporation of New
York
Filed Oct. 3, 1962, Ser. No. 228,036
3 Claims. (Cl. 106—39)

This invention relates to the manufacture of semicrystalline ceramic bodies in the system $$Li_2O \cdot Na_2O \cdot K_2O \cdot Al_2O_3 \cdot SiO_2 \cdot ZnO$$

In United States Patent No. 2,971,853, issued to Stanley D. Stookey, is described the formation of a semicrystalline ceramic body or a glass-ceramic, as it is frequently termed, through the crystallization in situ of a glass body. As explained therein, a glass-forming composition, to which a photosensitive metal of the group consisting of gold, silver, or copper is added thereto, is melted and thereafter cooled and shaped to a glass article of a desired configuration. The shape is then exposed to short-wave radiations, heated to a temperature above the annealing point, but below the softening point, of the glass for a period of time sufficient to form siliceous crystallites about submicroscopic nuclei of the photosensitive metal in an amount adequate to provide a crystalline structure rigid enough to prevent distortion of the article by the softening of its glassy matrix, and finally heating the article above the softening point of the original glass and above 800° C., but not above about 950° C., to cause further crystallization. The annealing and softening points are defined therein as the temperatures at which the viscosity of the glass is $10^{13.4}$ poises and $10^{7.6}$ poises, respectively.

Stookey observed that the use of a photosensitive metal to form nuclei or centers of crystallization for the development of a crystalline structure during the heat treating schedule was applicable for a fairly broad range of compositions in the $Li_2O \cdot Al_2O_3 \cdot SiO_2$ system. He had also observed that $Na_2O$ and $K_2O$ could be added to the batch to act as fluxes, but, as their presence had a deleterious effect upon the total crystalline content of the body, the amounts thereof should be kept low, preferably no more than 4% by weight of either. Further, he had learned that up to 6% by weight of other metal oxides could be tolerated which did not materially change the fundamental character of the glass but which functioned as fining agents, fluxes, or stabilizers, such as $As_2O_3$, $Sb_2O_3$, $B_2O_3$, and oxides of metals of the second periodic group, particularly ZnO.

Also in that patent, Stookey observed that the articles could be shaped by selectively etching or sculpturing by the method described and claimed in his Patent No. 2,628,160. This ability to be selectively sculptured has led to the use of this material in products such as electron tube spacers or mounting blocks and printed circuit boards where the necessary configuration of the product is exceedingly complex.

The exposure of a glass shape, produced in accordance with the teachings of United States Patent No. 2,971,853, to short-wave radiations followed by the heat treatment specified therein causes the glass shape to be converted into a body composed of fine-grained crystals randomly oriented and substantially uniformly dispersed within a glassy matrix, the crystals comprising the major portion of the mass of the body. This semicrystalline structure of the body commonly results in its physical properties being considerably different from those of the original glass. Thus, the density, the linear coefficient of thermal expansion, the strength, the softening point, and each of the other characteristics of the semicrystalline bodies are often several magnitudes removed from that of the original glass shapes. This factor created the problem which the present invention was developed to solve.

In the design of articles of complex configurations and where apertures of various dimensions and contours are incorporated therein, exceedingly close tolerances are often demanded. The selective etching or sculpturing noted hereinabove must of necessity be accomplished prior to the final heat treating step. That is to say, the final designing step is performed after the irradiating and initial heat treating steps but before the article is finally heated above the softening point of the glass body to maximize crystallization. The change in density between the original glass and the semicrystalline body has been so great as to prevent the widespread use of the crystalline article in applications such as electron tube spacers and printed circuit boards where extremely fine tolerances are required. Thus, although the glass body can be shaped and sculptured to the precise configurations desired, the final heat treating step, necessary to yield a material of much greater strength and higher softening point than the original glass, results in a body of so different a density that the precise configurations sculptured into the glass body are sufficiently altered as to make the product unuseable for the particular application.

In the field of thin film semiconductors, there has been an increasing need for substrate glasses having a thermal expansion close to that of the metallizing materials. The ability to form small and intricate shapes by means of the method disclosed in the Stookey patent would make this method ideally desirable in providing glass shapes for this use. Unfortunately, however, the coefficients of thermal expansion of these glasses generally range from $90–100 \times 10^{-7}/°$ C. whereas a coefficient of thermal expansion less than 80 and, preferably, less than $60 \times 10^{-7}/°$ C. is desired for developing a satisfactory seal between the glass and silicon or germanium, which have been found particularly suitable for use in semiconductors. At the present time, alumina, having a coefficient of thermal expansion of about $65 \times 10^{-7}/°$ C. is most widely used as the substrate material for this type of semiconductor. Nevertheless, the problems incident to forming alumina into the proper shapes have rendered this material less than completely satisfactory for this application.

It is, therefore, the principal object of my invention to provide a semicrystalline ceramic body from a photothermally opacifiable glass having a density identical to or very closely approximating that of the original glass and having a coefficient of thermal expansion less than $80 \times 10^{-7}/°$ C.

Another object of this invention is to provide a method of manufacturing a semicrystalline ceramic body from a photothermally opacifiable glass having a density identical or very closely approximating that of the original glass and having a coefficient of thermal expansion less than $80 \times 10^{-7}/°$ C.

Still another object of this invention is to provide semicrystalline ceramic bodies particularly suitable for use as electron tube spacers, printed circuit boards, and as substrate material for semiconductors.

I have found that these objects can be obtained where a very narrow range of glass compositions in the system $Li_2O \cdot Na_2O \cdot K_2O \cdot ZnO \cdot Al_2O_3 \cdot SiO_2$, viz., 7–11% $Li_2O$, 1–2% $Na_2O$, 3–5% $K_2O$, 3–4% ZnO, 12–16% $Al_2O_3$, and 62–74% $SiO_2$, is combined with photosensitive ingredients and subjected to a very stringent heat treating schedule. I have discovered that the density of the heat treated product of these glass compositions can be controlled by means of a specific heat treatment to match the original glass density to within less than one per cent, and, in some instances, to within less than one-tenth of one percent, and the coefficient of thermal expansion can be precisely controlled to as low as about $19 \times 10^{-7}/°$ C.

In the following examples, as recorded in Table I, the batches were compounded, dry ball milled to aid in obtaining a homogeneous melt, and then melted in open platinum crucibles for 4 to 6 hours at about 1450° C. in an electrically-fired furnace. The melts were stirred to aid homogeneity. After melting, the melts were cast into a steel mold, pressed, and then annealed at 400° C.

The amounts of photosensitive ingredients were not varied in the batches as those set forth in Table I are preferred for their efficacy, although the proportions discussed in United States Patent No. 2,971,853, are effective, viz., about 0.001–0.03% gold, computed as Au, about 0.001–0.3% silver, computed as AgCl, and about 0.001–1% copper computed as $Cu_2O$. The $CeO_2$ is added to increase the photosensitivity of the glass as is also disclosed in the same patent. The amount of $Sb_2O_3$ added to the batch as a fining agent was also held constant as being fully adequate in controlling seeds in the glass.

The glass-forming batches set forth in Table I are calculated to the oxide basis in parts by weight, exclusive of impurities which may be present in the batch materials. (The amounts of the photosensitive metals and of the $CeO_2$, being much less than one percent, are necessarily expressed as decimals to several significant places; but such practice is without significance in expressing the major constituents. Since each composition totals approximately 100, the amounts given for the various constituents thereof can, for practical purposes, be called percent by weight.) The batch ingredients may comprise any materials, either oxides or other compounds which, on being fused together, are converted to the desired oxide composition in the required proportions. Except for the partial loss of the fining agent, the composition as calculated from the batch components is substantially the same as that analyzed from the glass.

*Table I*

|  | 1 | 2 | 3 | 4 | 5 | 6 | 7 |
|---|---|---|---|---|---|---|---|
| $Li_2O$ | 7.85 | 7.85 | 9.43 | 7.85 | 6.26 | 6.26 | 7.85 |
| $Na_2O$ | 1.24 | 1.24 | 1.49 | 1.24 | 0.99 | 0.99 | 0.99 |
| $K_2O$ | 3.32 | 3.33 | 3.99 | 3.32 | 2.66 | 2.66 | 2.66 |
| $ZnO$ | 3.00 | 3.50 | 3.50 | 4.00 | 2.50 | 3.00 | 4.00 |
| $Al_2O_3$ | 11.93 | 13.93 | 13.93 | 15.93 | 9.93 | 11.93 | 15.93 |
| $SiO_2$ | 72.3 | 69.8 | 67.3 | 67.3 | 77.3 | 74.8 | 69.8 |
| $Sb_2O_3$ | 0.40 | 0.40 | 0.40 | 0.40 | 0.40 | 0.40 | 0.40 |
| $CeO_2$ | 0.0118 | 0.0118 | 0.0118 | 0.0118 | 0.0118 | 0.0118 | 0.0118 |
| Ag | 0.12 | 0.12 | 0.12 | 0.12 | 0.12 | 0.12 | 0.12 |
| Au | 0.001 | 0.001 | 0.001 | 0.001 | 0.001 | 0.001 | 0.001 |

The glass shape is photothermally opacified by being exposed to short-wave radiations, i.e., having a wave length of 2500 A. to 4000 A., and thereafter being heated to a temperature between about 560° C. and 670° C. to cause the formation of crystallites. This crystallization is initiated through the preliminary formation of submicroscopic particles of gold, silver, or copper, depending upon the photosensitive metal used, throughout the glass as nuclei or centers of crystallization.

Although such heat treatment may merely consist of heating the body to a temperature within that range and maintaining thereat for a period of time sufficient to attain the desired opacification, I have learned that precise control of physical properties in the final semicrystalline body cannot be realized unless a two-step thermal opacification is practiced. Herein, the glass shape is first heated in a nucleation step to about 560°–620° C. for at least two minutes and, advantageously, thirty minutes to one hour. The temperature of the nucleated body is then raised in a growth step to about 625°–670° C. and maintained thereat for at least 5 minutes and, preferably, forty minutes to one hour. This practice provides for the development of crystallites about the nuclei of photosensitive metals. These crystallites serve to enable the sculpturing of the glass body and to support the body against deformation during the final heat treating step wherein the body is raised above the softening point of the glassy matrix. X-ray diffraction analyses of the glasses of the invention after opacification have determined lithium metasilicate to be the predominant crystallite phase.

As the temperatures encompassed in the nucleation step are above the annealing point, but below the softening point, (400°–450° C. and 700°–725° C., respectively, for the glasses of this invention), the temperature of the body may be raised at as fast a rate as desired commensurate with the resistance to thermal shock possessed by the glass and the physical size of the body. For safety's sake, a rate of 5° C./minute is commonly employed although rates much faster have proved satisfactory, particularly with thin-walled articles. Once the nuclei of the photosensitive metals have been developed in the nucleation step, the temperature can be raised at a rather rapid rate to the range included in the growth step although, here again, 5° C./minute is generally employed.

The irradiation step is patterned after that described in United States Patent No. 2,628,160. Various exposure times of 15 seconds to one hour produced satisfactory products, with about 30 minutes appearing to be the optimum.

The final heat treatment of the heterogeneously-nucleated body wherein it is converted to a semicrystalline ceramic article comprises raising the temperature of the body to at least about 750° C., but not more than about 850° C., and holding thereat for a period of time sufficient to attain the desired crystallization. Laboratory experimentation has shown the preferred time to range between ½–4 hours, with one hour being the optimum.

As discussed hereinbefore, any necessary sculpturing of the body to yield a shape of the desired configuration is undertaken before the final heat treating step. Thus, e.g., if an article containing an arrangement of holes or slots is to be made, a pattern impervious to short-wave radiations is first placed upon the glass body resulting from melting the batch and then cooling the melt. The glass body having the pattern thereon is irradiated with short-wave radiations and, after the pattern is removed, is thereafter subjected to the nucleation and growth steps described previously in order to produce lithium metasilicate crystallites in those areas of the glass body which had been exposed to the radiation. The lithium metasilicate dissolves readily in hydrofluoric acid and this selective solution allows those areas containing crystals to be etched away from the original body portion. It will be understood that after this etching procedure the article then consists of a glass body having a desired arrangement of holes or slots therein. The glass body may be converted into a semicrystalline ceramic body by merely exposing it to a temperature of about 900°–950° C. This procedure has two drawbacks: (1) The temperatures involved are considerably above the softening point of the glass and extreme care must be used in preventing deformation of the body. This situation is rendered more critical because there has been no development of a supporting crystal structure of lithium metasilicate crystallites. (2) The absence of prior heterogeneous nucleation leads to the production of a less densely crystalline final product whose crystallization is not as desirably uniform in size. Therefore, in the preferred practice, after the etching step, the glass body is again exposed to short-wave radiation, but without the pattern, subjected to the nucleation and growth steps, and only then passed to the final heat treatment. This procedure provides for the control of tolerances which is so essential in the manufacture of articles of complex configurations.

Although the nucleation and growth steps mentioned hereinabove provided for the development of a supporting structure of lithium metasilicate crystallites, I prefer to raise the temperature of the body to the final heat treating step at but 5° C./minute although much more rapid heating rates have yielded bodies showing no deformation. Where articles of critical tolerances are contemplated, a rate of heating no more rapid than about 5° C./minute will assure the absence of deformation as the glassy matrix is raised above its softening point.

Tables II and III record the criticality of the glass compositions and the final heat treatment to which the glass shapes are subjected. Each of the glass bodies of the examples was exposed to a 1000 watt General Electric No. 533 mercury arc lamp for 32 minutes. After this, the glass shapes were nucleated by raising the temperatures thereof to within the nucleation range (560°–620° C.), as set out in Tables II and III, and maintained thereat for about 30 minutes. Thereafter, the temperature of the bodies was raised to within the growth range (625°–670° C.), as also set forth in Tables II and III, and maintained thereat for about 40 minutes. Subsequently, the bodies were raised to a final heat treating temperature, maintained thereat for one hour, as recorded in Tables II and III, and then cooled to room temperature. These semicrystalline ceramic bodies possess very good resistance to thermal shock and, therefore, may be rapidly cooled to room temperature. In these examples, the heat to the heat treating furnace was merely cut off and the furnace allowed to cool at its own rate with the bodies retained within. The semicrystalline articles were removed from the furnace and specific gravity measurements obtained following conventional methods. These measurements are recorded in Table II under the temperatures set out in the final heat treating schedule. Table II also includes specific gravity measurements taken on the original glass shape such that the original and final densities (gm./cc.) can be compared directly. The linear thermal coefficient of expansion from 0–300° C. ($\times 10^7$) was also determined in the conventional manner and recorded in Table III.

*Table II*

| No. | Glass Density | Nucl. Temp., ° C. | Growth Temp., ° C. | Final Heat Treatment | | | | |
|---|---|---|---|---|---|---|---|---|
| | | | | 900° C. | 850° C. | 800° C. | 750° C. | 700° C. |
| 1 | 2.416 | 620 | 650 | 2.441 | 2.429 | 2.425 | 2.434 | 2.461 |
| | | 580 | 630 | 2.442 | 2.430 | 2.429 | 2.432 | 2.465 |
| 2 | 2.431 | 620 | 630 | 2.459 | 2.429 | 2.440 | 2.441 | 2.458 |
| | | 570 | 650 | 2.457 | 2.426 | 2.443 | 2.443 | 2.456 |
| 3 | 2.445 | 620 | 630 | 2.471 | 2.442 | 2.447 | 2.457 | 2.487 |
| | | 560 | 660 | 2.473 | 2.443 | 2.449 | 2.460 | 2.489 |
| 4 | 2.461 | 580 | 640 | 2.489 | 2.465 | 2.456 | 2.469 | 2.488 |
| | | 600 | 650 | 2.487 | 2.468 | 2.458 | 2.470 | 2.487 |
| 5 | 2.381 | 580 | 650 | 2.466 | 2.446 | 2.441 | 2.434 | 2.435 |
| | | 590 | 630 | 2.471 | 2.451 | 2.438 | 2.441 | 2.443 |
| 6 | 2.402 | 580 | 650 | 2.478 | 2.462 | 2.450 | 2.459 | 2.472 |
| | | 600 | 630 | 2.479 | 2.461 | 2.453 | 2.456 | 2.470 |
| 7 | 2.444 | 560 | 660 | 2.494 | 2.472 | 2.473 | 2.475 | 2.483 |
| | | 580 | 650 | 2.492 | 2.470 | 2.475 | 2.481 | 2.488 |

*Table III*

| No. | Nucl. Temp., ° C. | Growth Temp., ° C. | Expansion Coefficient$\times 10^{-7}$/° C. | | | | |
|---|---|---|---|---|---|---|---|
| | | | 900° C. | 850° C. | 800° C. | 750° C. | 700° C. |
| 1 | 620 | 650 | 81.4 | 44.0 | 39.2 | 74.2 | 82.1 |
| 2 | 620 | 630 | 93.1 | 69.4 | | 48.9 | 85.7 |
| 3 | 620 | 630 | 89.7 | 56.8 | 36.7 | 40.7 | 84.5 |
| 4 | 580 | 640 | 88.8 | 46.8 | 37.3 | 58.6 | 83.2 |
| 5 | 580 | 650 | 91.2 | 56.1 | | 62.9 | 94.1 |
| 6 | 580 | 650 | 96.4 | 76.3 | 45.3 | 50.7 | 83.8 |
| 7 | 560 | 660 | 90.2 | 71.7 | 19.1 | | 91.3 |

It can be readily observed from Tables II and III that the temperature employed in the final heat treating step plays a vital role in determining the density and thermal expansion of the semicrystalline article. Likewise, the composition of the original glass is extremely sensitive to changes in density and thermal expansion. As discussed hereinabove, the most desirable product would have no change in density between the original glass and the semicrystalline body obtained through irradiation and heat treatment of the glass. I have found that shapes having very fine tolerances can be successfully produced where the change in density between the original glass shape and the heat treated body is less than 1% and preferably less than 0.5%. This factor has severely limited the use of semicrystalline products in applications of this type. However, Examples 1 to 4, when subjected to a final heat treatment between about 750°–850° C. will yield bodies conforming to this requirement. Examples 2 and 3, when heat treated at 800° C. or 850° C., show a density differential of less than 0.1%.

In order to graphically illustrate the relation of composition and heat treatment in obtaining the desired density of body, FIG. 1 is submitted hereinbelow. Herein are presented curves described from plotting the specific gravity of the semi-crystalline ceramic as a percentage of the specific gravity of the original glass versus the temperature of the final heat treatment. Only the curve resulting from the first nucleation and growth steps in each example, as set forth in Table II, is plotted.

FIG. 1 clearly demonstrates the intense criticality of the final heat treating step in obtaining semicrystalline bodies having a specific gravity of 99–101% of that of the glass body of identical composition, which is required in producing shapes having very fine tolerances. It can be observed that the nucleation and growth steps also exhibit some effect on the final density of the crystalline product but this effect is very minor when compared to the final heat treatment.

Table III clearly points out that coefficients of thermal expansion of less than $80 \times 10^{-7}$/° C. are possible with the prescribed compositions and heat treatments of this invention. Table III also illustrates that through the judicious choice of heat treating schedules the expansion of the final product can be tailored to closely match a metallizing material such as silicon or germanium. Thus, the coefficient of thermal expansion of Example 7 can be varied from a low of about $19 \times 10^{-7}$/° C.

In order to gain an understanding as to the reasons why these specific compositions, when subjected to the particular heat treatment, will yield desirable bodies, while nearby compositions and compositions within the specified range will not yield desirable bodies when the prescribed heat treatment is not pursued, X-ray diffraction analyses were conducted on the semicrystalline bodies. Three major phases were observed in the different bodies in varying proportions: (1) lithium metasilicate, (2) beta-spodumene solid solution, and (3) "silica O." "Silica O" refers to a beta-eucryptite-beta-quartz solid solution phase or a series of isostructural materials of which beta-eucrytite and beta-quartz are typical end members; it is not a form of silica.

Lithium metasilicate crystals produce a high expansion and an increase in density. Silica O crystals produce a low expansion and cause an increase in density also. However, the beta-spodumene solid solution crystals produce a decrease in density, and a low expansion (but not as low as silica O). These crystal phases, then, act to balance the change in density and expansion which would result from the presence of but any one of these crystals. The existence of these phases is brought about through the careful control of the glass composition and heat treatment.

The heterogeneously-nucleated crystallization in these semicrystalline bodies has been determined to be high, at least about 30 weight percent, but is generally in the vicinity of 50 weight percent, and is often, and preferably, higher. This factor is dependent upon the extent to which the batch components are adaptable to the formation of crystal phases. The crystals, themselves, are very fine grained, i.e., substantially all finer than about 30 microns in diameter, and are randomly dispersed throughout the glassy matrix.

Although the glass shapes specifically described hereinabove were obtained by melting the batch in a crucible and then pressing the desired configuration, it will be understood that the batches may also be melted in pots or tanks or other melting media, and that any of the conventional glass-forming methods such as blowing, casting, drawing, rolling, or spinning are also applicable.

Figure 2:
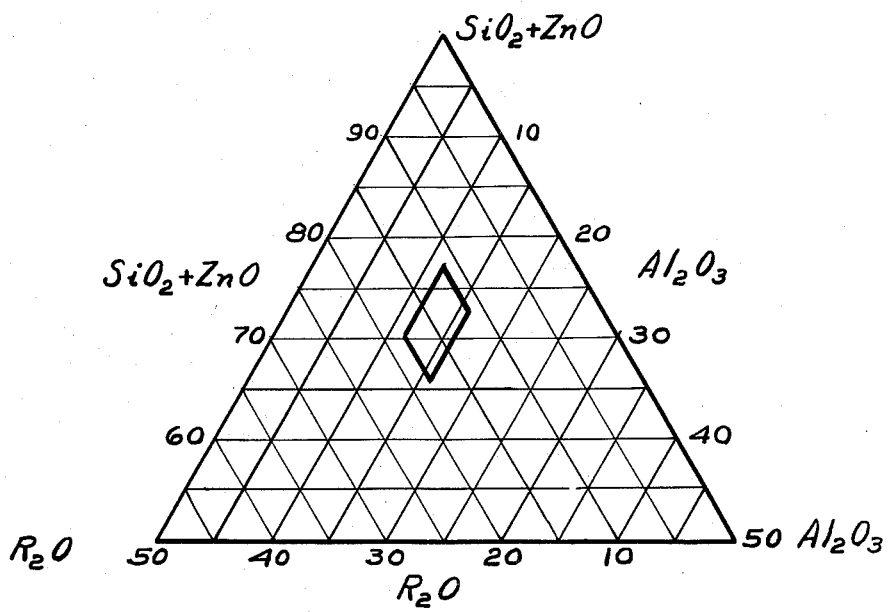

FIG. 2 illustrates the ranges of glass compositions included in the invention. For convenience, the amounts of the fining agent and the photosensitive metals have been omitted and the remaining six components reduced to a three component system by combining the $Li_2O$, $Na_2O$, and $K_2O$ as one component, $R_2O$, the ZnO combined with the $SiO_2$ as another component, and the $Al_2O_3$ set forth as the third component.

Figure 3:
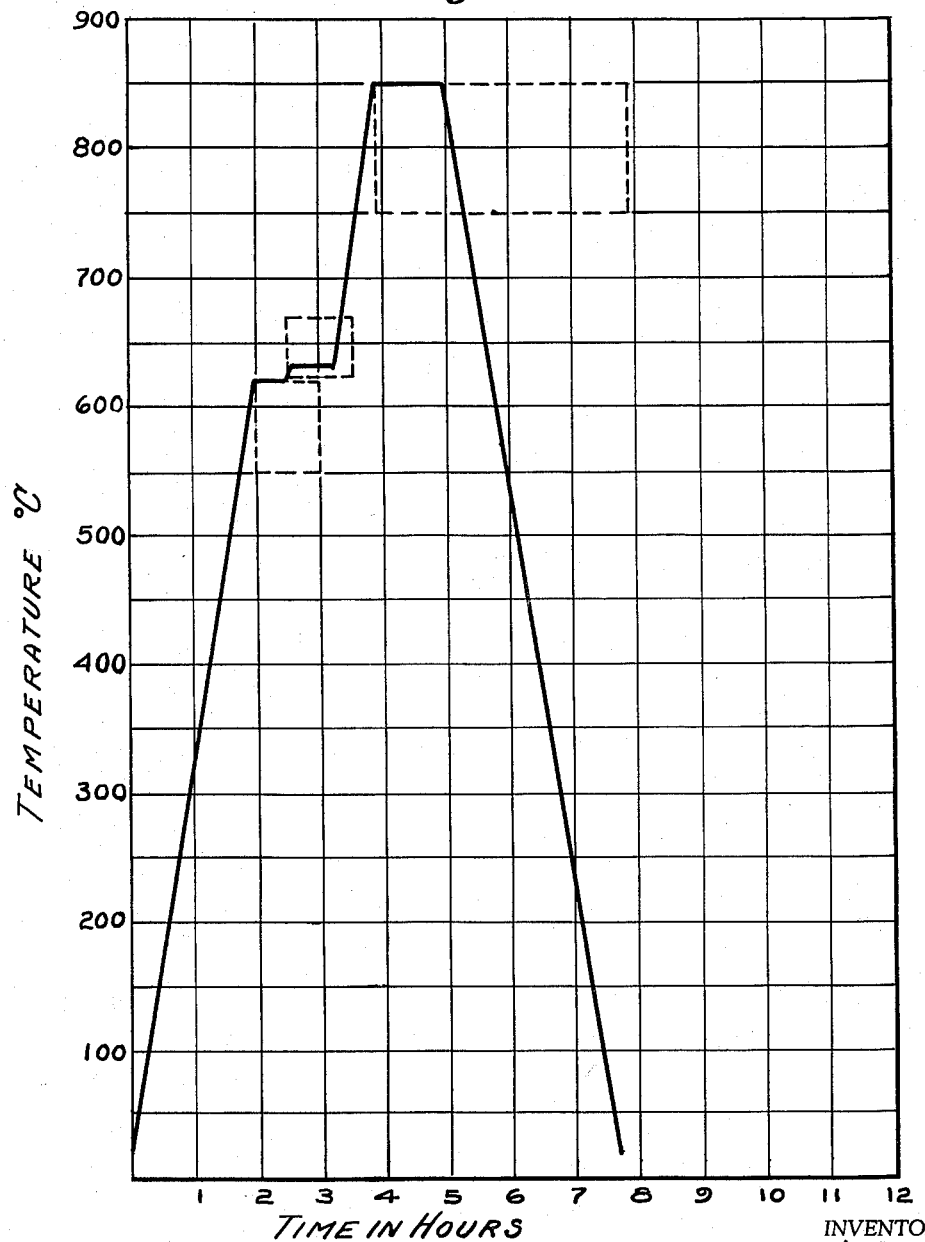

FIG. 3 sets forth a time-temperature curve for a heat treating schedule of Example 3, which example produces semicrystalline bodies having densities very similar to the original glass and coefficients of thermal expansion less than $60 \times 10^{-7}/°C$. After the batch had been melted in an open crucible at 1450° C. for about 4 hours, a casting pressed into a steel mold, and cooled to room temperature, the casting was irradiated for about 30 minutes and given the following heat treatment: The temperature was raised at 5° C./minute to 620° C., maintained thereat for 30 minutes, thereafter the temperature was raised at 5° C./minute to 630° C., maintained thereat for 40 minutes, subsequently the temperature was raised at 5° C./minute to 850° C., maintained thereat for one hour, after which the heat to the furnace was cut off and the furnace allowed to cool to room temperature with the casting therein. It will be realized that this cooling rate was not linear but was more rapid at higher temperature. Nevertheless, for convenience in completing the curve, an average cooling rate of 5° C./minute has been selected. The areas enclosed within the dotted lines represent the ranges of times of the nucleation, growth, and final heat treating steps, respectively.

What is claimed is:

1. A semicrystalline ceramic body having a coefficient of thermal expansion at 0–300° C. ranging from about $19-80 \times 10^{-7}/°C$. and a specific gravity of 99–101% of that of the glass body of identical composition consisting essentially of a multiplicity of heterogeneously-nucleated inorganic crystals randomly dispersed in a glassy matrix, said crystals being predominantly lithium metasilicate, silica O, and beta-spodumene solid solution and being formed by crystallization in situ about submicroscopic nuclei of a photosensitive metal from a glass body consisting essentially, by weight, of 7–11% $Li_2O$, 1–2% $Na_2O$, 3–5% $K_2O$, 3–4% ZnO, 12–16% $Al_2O_3$, 62–74% $SiO_2$, and the indicated proportion of at least one photosensitive metal selected from the group consisting of 0.001–0.03% gold computed as Au, 0.001–0.3% silver computed as AgCl, and 0.001–1% copper computed as $Cu_2O$, substantially all of said crystals being smaller than 30 microns in diameter and comprising at least 30% by weight of said semi-crystalline ceramic body, said glassy matrix consisting essentially of the uncrystallized portion of the glass remaining after the development of the crystals.

2. A method of manufacturing a semicrystalline ceramic body having a coefficient of thermal expansion at 0–300° C. ranging from about $19-80 \times 10^{-7}/°C$. and a specific gravity of 99–101% of that of the glass body of identical composition which comprises providing an article of photothermally opacifiable glass consisting essentially, by weight, of 7–11% $Li_2O$, 1–2% $Na_2O$, 3–5% $K_2O$, 3–4% ZnO, 12–16% $Al_2O_3$, 62–74% $SiO_2$, and the indicated proportion of at least one photosensitive metal selected from the group consisting of 0.001–0.03% gold computed as Au, 0.001–0.3% silver computed as AgCl, and 0.001–1% copper computed as $Cu_2O$, exposing the article to short-wave radiations, heating the exposed article to a temperature of at least about 560° C., but not more than about 620° C., for at least 2 minutes to initiate the nucleation of submicroscopic nuclei of photosensitive metal, raising the temperature of said article to at least about 625° C., but not more than about 670° C., for at least 5 minutes to opacify the glass by forming therein siliceous crystallites which are predominantly lithium metasilicate in an amount adequate to support the article against deformation upon heating to a temperature above the softening point of the original glass, raising the temperature of said article to at least about 750° C., but not more than about 850° C., for a time sufficient to attain the desired crystallization consisting predominantly of lithium metasilicate, silica O, and beta-spodumene solid solution, and thereafter cooling said article to room temperature.

3. A method according to claim 2 wherein said time sufficient to initiate nucleation ranges from 2–60 minutes, said time to form siliceous crystallites ranges from 5–60 minutes, and said time to initiate the desired crystallization ranges from ½–4 hours.

References Cited in the file of this patent
UNITED STATES PATENTS
2,971,853     Stookey  ---------------- Feb. 14, 1961